(12) United States Patent
Sherman (10) Patent No.: US 12,428,165 B2
(45) Date of Patent: Sep. 30, 2025

(54) NACELLE INLET STRUCTURE WITH FOAM CORE

(71) Applicant: Rohr, Inc., Chula Vista, CA (US)

(72) Inventor: Brian A. Sherman, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 74 days.

(21) Appl. No.: 18/205,777

(22) Filed: Jun. 5, 2023

(65) Prior Publication Data
US 2024/0400218 A1    Dec. 5, 2024

(51) Int. Cl.
*B64D 33/02*    (2006.01)

(52) U.S. Cl.
CPC ...... *B64D 33/02* (2013.01); *B64D 2033/0206* (2013.01); *B64D 2033/0233* (2013.01); *B64D 2033/0286* (2013.01)

(58) Field of Classification Search
CPC ........ B64D 15/12; B64D 15/14; B64D 33/00; B64D 33/02; B64D 2033/0206; B64D 2033/0233; B64D 2033/0266; B64D 2033/0286; F02C 7/04; F02C 7/045; F02C 7/047
USPC ...................................................... 244/53 B
See application file for complete search history.

(56) References Cited

U.S. PATENT DOCUMENTS

| | | | |
|---|---|---|---|
| 6,338,455 B1 * | 1/2002 | Rauch | H05B 3/16 244/134 R |
| 8,549,832 B2 | 10/2013 | Maheshwari | |
| 8,794,572 B2 * | 8/2014 | Porte | B64D 33/02 244/1 N |
| 9,004,407 B2 | 4/2015 | Calder | |
| 9,010,084 B2 * | 4/2015 | Chelin | B64D 15/04 244/54 |
| 9,061,769 B2 * | 6/2015 | Boulet | B64D 33/02 |
| 9,511,848 B2 * | 12/2016 | Gerber | B64C 3/26 |
| 9,663,238 B2 * | 5/2017 | Kane | B64D 33/02 |
| 9,874,228 B2 * | 1/2018 | Brown | F02C 7/04 |
| 9,938,852 B2 * | 4/2018 | Lumbab | B64D 33/02 |

(Continued)

FOREIGN PATENT DOCUMENTS

| | | |
|---|---|---|
| CN | 111577464 A | 8/2020 |
| FR | 2940377 B1 | 12/2012 |
| GB | 2256395 B | 7/1995 |

OTHER PUBLICATIONS

EP Search Report for EP Patent Application No. 24180314.7 dated Oct. 11, 2024.

*Primary Examiner* — Joshua E Rodden
(74) *Attorney, Agent, or Firm* — Getz Balich LLC (57) ABSTRACT

An assembly is provided for an aircraft propulsion system. This assembly includes a nacelle inlet structure extending axially along and circumferentially about an axis. The nacelle inlet structure includes an inlet lip skin, an inner barrel, an outer barrel, a foam core and an acoustic structure. The inlet lip skin forms a leading edge of the nacelle inlet structure. The inner barrel projects axially aft from the inlet lip skin. The inner barrel forms a perforated face skin of the acoustic structure. The outer barrel projects axially aft from the inlet lip skin. The outer barrel is radially outboard of the inner barrel. The foam core is radially between the inner barrel and the outer barrel. The foam core axially overlaps the perforated face skin and projects axially to the inlet lip skin.

19 Claims, 8 Drawing Sheets

(56) References Cited

U.S. PATENT DOCUMENTS

| | | | | |
|---|---|---|---|---|
| 10,160,552 B2* | 12/2018 | Crawford | ............... | F02C 7/04 |
| 10,533,497 B2* | 1/2020 | Welch | ............... | F02C 7/24 |
| 11,310,872 B2 | 4/2022 | Sandiford | | |
| 11,384,688 B2* | 7/2022 | Bourhis | ............... | F02C 7/055 |
| 11,518,526 B2* | 12/2022 | Porte | ............... | B64D 29/00 |
| 11,591,098 B2* | 2/2023 | Vinches | ............... | B64D 29/08 |
| 12,077,320 B2* | 9/2024 | Rust | ............... | B23K 26/0823 |
| 2008/0179448 A1* | 7/2008 | Layland | ............... | H05B 3/28 |
| | | | | 244/1 N |
| 2010/0000066 A1* | 1/2010 | Boissy | ............... | B64D 15/12 |
| | | | | 29/428 |
| 2011/0167781 A1* | 7/2011 | Maheshwari | ............... | B64D 15/12 |
| | | | | 977/902 |
| 2014/0026974 A1* | 1/2014 | Desjoyeaux | ............... | B29D 99/001 |
| | | | | 264/258 |
| 2017/0127477 A1 | 5/2017 | Sandiford | | |
| 2017/0210477 A1* | 7/2017 | Mackin | ............... | B64D 15/06 |
| 2018/0245515 A1 | 8/2018 | Roach | | |
| 2020/0164962 A1 | 5/2020 | Rowe | | |
| 2022/0042455 A1* | 2/2022 | Guillois | ............... | B64D 33/02 |
| 2024/0017839 A1* | 1/2024 | Rust | ............... | B64D 15/08 |
| 2024/0077018 A1* | 3/2024 | Nayak | ............... | F02C 7/047 |

* cited by examiner

NACELLE INLET STRUCTURE WITH FOAM CORE

BACKGROUND

1. Technical Field

This disclosure relates generally to an aircraft propulsion system and, more particularly, to an inlet structure for the aircraft propulsion system.

2. Background Information

A nacelle for an aircraft propulsion system may include an electric thermal anti-icing system for reducing/preventing ice accumulation on an inlet lip of a nacelle inlet structure. Various types and configurations of anti-icing systems as well as inlet structures are known in the art. While these known anti-icing systems and inlet structures have various benefit, there is still room in the art for improvement.

SUMMARY OF THE DISCLOSURE

According to an aspect of the present disclosure, an assembly is provided for an aircraft propulsion system. This assembly includes a nacelle inlet structure extending axially along and circumferentially about an axis. The nacelle inlet structure includes an inlet lip skin, an inner barrel, an outer barrel, a foam core and an acoustic structure. The inlet lip skin forms a leading edge of the nacelle inlet structure. The inner barrel projects axially aft from the inlet lip skin. The inner barrel forms a perforated face skin of the acoustic structure. The outer barrel projects axially aft from the inlet lip skin. The outer barrel is radially outboard of the inner barrel. The foam core is radially between the inner barrel and the outer barrel. The foam core axially overlaps the perforated face skin and projects axially to the inlet lip skin.

According to another aspect of the present disclosure, another assembly is provided for an aircraft propulsion system. This assembly includes a nacelle inlet structure extending axially along and circumferentially about an axis. The nacelle inlet structure includes an inlet lip skin, an inner barrel, an outer barrel, a bulkhead and a foam core. The inlet lip skin forms a leading edge of the nacelle inlet structure. The inner barrel projects axially aft from the inlet lip skin. The outer barrel projects axially aft from the inlet lip skin. The bulkhead is radially between the inner barrel and the outer barrel. The bulkhead is formed integral with the inlet lip skin, the inner barrel and the outer barrel. The foam core is radially between the inner barrel and the outer barrel. The foam core extends axially within the nacelle inlet structure from the inlet lip skin to the bulkhead.

According to still another aspect of the present disclosure, another assembly is provided for an aircraft propulsion system. This assembly includes a fan case and a nacelle inlet structure. The fan case extends axially along and circumferentially about an axis. The nacelle inlet structure is mounted to the fan case. The nacelle inlet structure extends axially along and circumferentially about the axis. The nacelle inlet structure includes an inlet lip skin, an inner barrel, an outer barrel, a foam core and an electric heater. The inlet lip skin forms a leading edge of the nacelle inlet structure. The inner barrel projects axially aft from the inlet lip skin to the fan case. The outer barrel projects axially aft from the inlet lip skin. The foam core is radially between the inner barrel and the outer barrel. The foam core extends axially within the nacelle inlet structure to the inlet lip skin. The electric heater is integrated with the inlet lip skin.

The nacelle inlet structure may also include an acoustic structure. The inner barrel may form a perforated face skin of the acoustic structure. The foam core may axially overlap the perforated face skin.

The nacelle inlet structure may also include an electric heater embedded within a polymeric material forming the inlet lip skin.

The nacelle inlet structure may also include a bulkhead. The bulkhead may be connected to the outer barrel at an aft end of the outer barrel. The foam core may extend axially within the nacelle inlet structure from the inlet lip skin to the bulkhead.

The nacelle inlet structure may also include a bulkhead. The bulkhead may extend radially from the acoustic structure to the outer barrel. The foam core may extend axially within the nacelle inlet structure from the inlet lip skin to the bulkhead.

The nacelle inlet structure may also include a bulkhead. The bulkhead may extend radially from the inner barrel to the outer barrel. The foam core may extend axially within the nacelle inlet structure from the inlet lip skin to the bulkhead.

The nacelle inlet structure may also include a bulkhead. The bulkhead may extend radially to the outer barrel. The bulkhead may be aligned with an intermediate location axially along the acoustic structure. The foam core may extend axially within the nacelle inlet structure from the inlet lip skin to the bulkhead.

The nacelle inlet structure may also include a bulkhead radially between the inner barrel and the outer barrel. The bulkhead may be formed integral with the inlet lip skin, the inner barrel and the outer barrel. The foam core may extend axially within the nacelle inlet structure from the inlet lip skin to the bulkhead.

A channel may extend radially into the foam core. The acoustic structure may include a cellular core radially outboard of the perforated face skin. The cellular core may be disposed in the channel.

The channel may project axially into the foam core.

The foam core may extend radially out from the acoustic structure to the outer barrel.

The acoustic structure may include a cellular core radially outboard of the perforated face skin. The foam core may be configured from or otherwise include the cellular core.

The nacelle inlet structure may also include an electric heater integrated with the inlet lip skin.

The inlet lip skin may be configured from or otherwise include a polymeric material. The electric heater may be embedded within the polymeric material.

The polymeric material may be configured from or otherwise include thermoplastic material.

The polymeric material may include a polymeric matrix and fiber-reinforcement embedded within the polymeric matrix. The electric heater may be embedded within the polymeric matrix.

The electric heater may be configured as or otherwise include a carbon nanotube heater.

The assembly may also include an electric line electrically coupled to the electric heater. The electric line may project axially through an internal passage within the foam core.

The electric heater may be a first electric heater forming a first heating zone along the inlet lip skin. The nacelle inlet structure may also include a second electric heater integrated with the inlet lip skin and forming a second heating zone along the inlet lip skin.

The assembly may also include a fan case. The nacelle inlet structure may be mounted to the fan case. The inner barrel may be axially adjacent the fan case.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
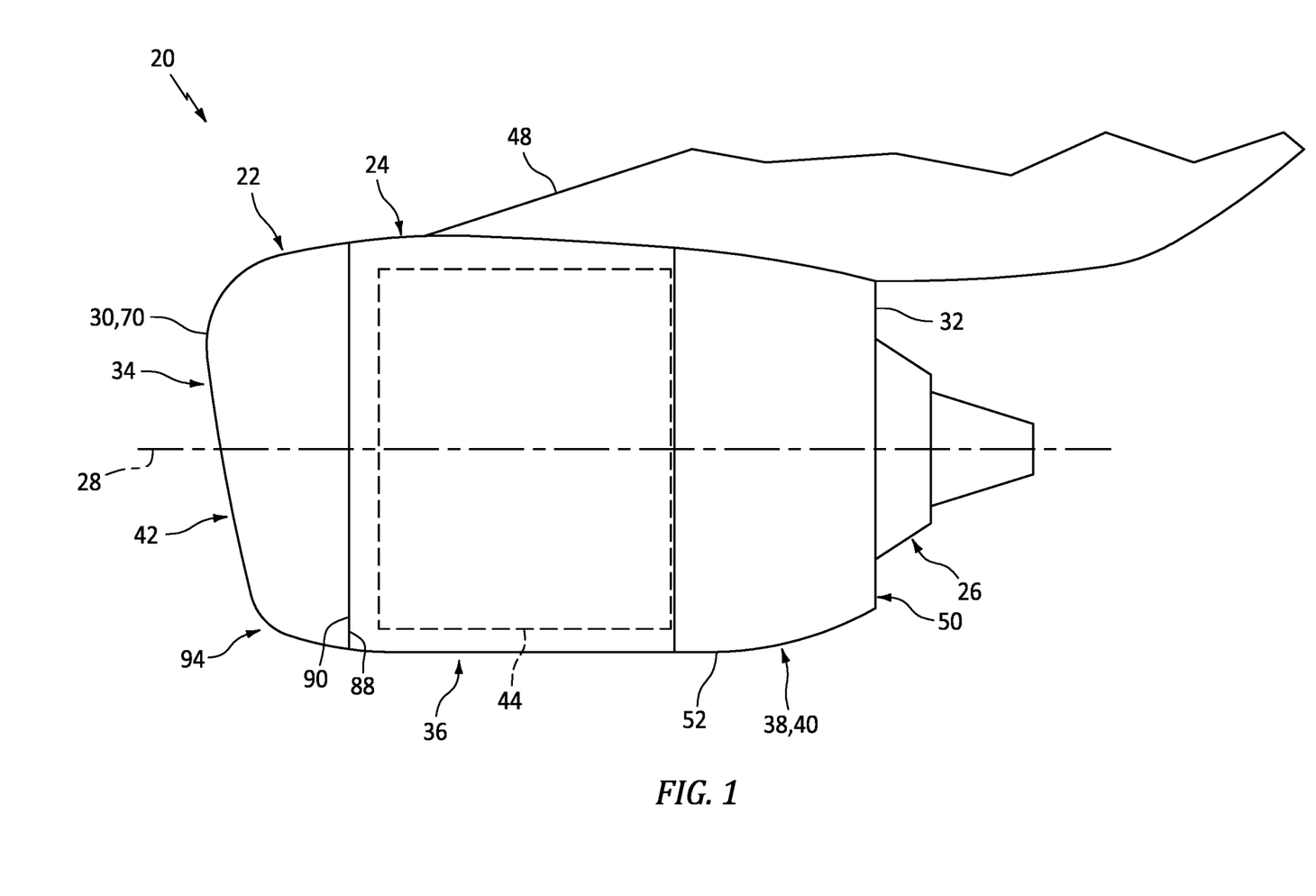
FIG. 1 is a side illustration of an aircraft propulsion system with a pylon.

FIG. 1 illustrates an aircraft propulsion system 20 for an aircraft such as, but not limited to, a commercial airliner or a cargo plane. The aircraft propulsion system 20 includes an engine nacelle 22 and a gas turbine engine. This gas turbine engine may be configured as a high-bypass turbofan engine. Alternatively, the gas turbine engine may be configured as a turbojet engine or any other type of gas turbine engine capable of propelling the aircraft during flight.

The engine nacelle 22 is configured to house and provide an aerodynamic cover for the gas turbine engine. The engine nacelle 22 of FIG. 1, for example, includes a nacelle outer structure 24 and a nacelle inner structure 26; e.g., an inner fixed structure (IFS).

The outer structure 24 extends axially along an axial centerline 28 between an upstream, forward end 30 of the engine nacelle 22 and its outer structure 24 and a downstream, aft end 32 of the outer structure 24. Briefly, the axial centerline 28 may be a centerline axis of the engine nacelle 22 and/or the gas turbine engine, and/or a rotational axis for one or more rotating components (e.g., spools) of the gas turbine engine. The outer structure 24 of FIG. 1 includes a nacelle inlet structure 34, one or more nacelle fan cowls 36 (one cowl visible in FIG. 1) and a nacelle aft structure 38, which may be configured as part of or include a thrust reverser system 40. However, in other embodiments, the aircraft propulsion system 20 may be configured without the thrust reverser system 40.

The inlet structure 34 is disposed at the nacelle forward end 30. The inlet structure 34 is configured to direct a stream of air through an inlet opening 42 (see also FIG. 2) at the nacelle forward end 30 into the aircraft propulsion system 20 and towards a fan section of the gas turbine engine.

The fan cowls 36 are disposed axially between the inlet structure 34 and the aft structure 38. Each fan cowl 36 of FIG. 1, in particular, is disposed at an aft end of a stationary portion of the engine nacelle 22, and each fan cowl 36 extends forward to the inlet structure 34. Each fan cowl 36 is generally axially aligned with the fan section of the gas turbine engine. The fan cowls 36 are configured to provide an aerodynamic covering for a fan case 44, which fan case 44 circumscribes a fan rotor within the fan section and may partially form an outer peripheral boundary of an inlet flowpath 46 (see FIG. 2) of the aircraft propulsion system 20.

The term "stationary portion" is used above to describe a portion of the engine nacelle 22 that is stationary during propulsion system operation (e.g., during aircraft taxiing, aircraft takeoff, aircraft flight and aircraft landing). However, the stationary portion may be otherwise movable for inspection/maintenance of the aircraft propulsion system 20; e.g., when the aircraft propulsion system 20 is non-operational. Each of the fan cowls 36, for example, may be configured to provide access to components of the gas turbine engine such as the fan case 44 and/or peripheral equipment arranged with (e.g., mounted to) the fan case 44 for inspection, maintenance and/or otherwise. In particular, each of the fan cowls 36 may be pivotally mounted with the aircraft propulsion system 20 (e.g., to a pylon structure 48) by, for example, a pivoting hinge system. The present disclosure, however, is not limited to the foregoing fan cowl configurations and/or access schemes.

The aft structure 38 of FIG. 1 is disposed at the outer structure aft end 32. The aft structure 38 is configured to form a bypass exhaust 50 for a bypass flowpath with the inner structure 26, where the bypass exhaust 50 extends radially from the inner structure 26 to the aft structure 38 of the outer structure 24. The aft structure 38 may include one or more translating sleeves 52 (one sleeve visible in FIG. 1) for the thrust reverser system 40. The present disclosure, however, is not limited to such a translating sleeve thrust reverser system.

Figure 2:
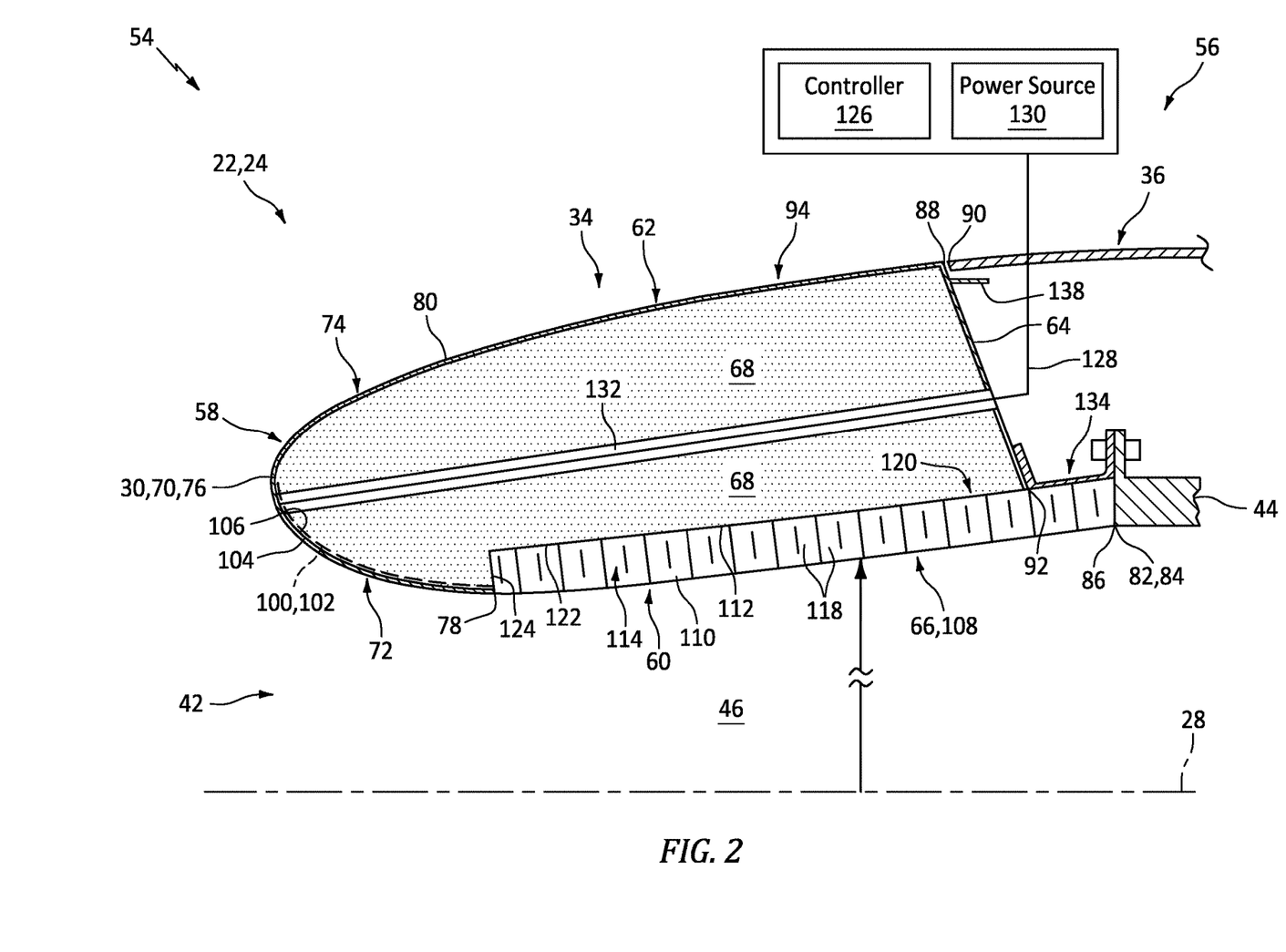
FIG. 2 is a partial sectional illustration of the propulsion system at a nacelle inlet structure with an electric thermal anti-icing system.

FIG. 2 illustrates an assembly 54 for the aircraft propulsion system 20. This propulsion system assembly 54 includes the inlet structure 34, the fan cowls 36 (one cowl visible in FIG. 2) and the fan case 44. The propulsion system assembly 54 also includes an electric thermal anti-icing system 56.

The inlet structure 34 of FIG. 2 includes an annular inlet lip skin 58 (e.g., a nose lip), a tubular inner barrel 60, a tubular outer barrel 62 and an annular bulkhead 64. The inlet structure 34 also includes an acoustic structure 66, a foam core 68 and one or more components of the anti-icing system 56.

The inlet lip skin 58 forms a leading edge 70 of the engine nacelle 22 as well as the inlet opening 42 into the aircraft propulsion system 20 (see FIG. 1), where the leading edge 70 is located at the nacelle forward end 30. The inlet lip skin 58 has a cupped (e.g., generally U-shaped or V-shaped) cross-sectional geometry which extends circumferentially about (e.g., completely around) the axial centerline 28.

The inlet lip skin 58 includes an inner lip portion 72 and an outer lip portion 74. Each of these lip skin portions 72 and 74 may have a convex, curved sectional geometry when viewed in a reference plane, for example, parallel with (e.g., including) the axial centerline 28. Each lip skin portion 72, 74 extends circumferentially about (e.g., completely around) the axial centerline 28. The inner lip portion 72 extends axially along the axial centerline 28 from a forward intersection 76 with the outer lip portion 74 at the leading edge 70 to an aft intersection 78 with the inner barrel 60. The outer lip portion 74 extends axially along the axial centerline 28 from its forward intersection 76 with the inner lip portion 72 to an aft intersection 80 with the outer barrel 62. As the outer lip portion 74 extends axially towards the outer barrel 62 (e.g., to its aft intersection 80 with the outer barrel 62), the outer lip portion 74 axially overlaps and diverges radially away from (in a radial outward direction away from the axial centerline 28) the inner lip portion 72. The outer lip portion 74 is thereby radially outboard of and may circumscribe the inner lip portion 72.

The inner barrel 60 extends circumferentially about (e.g., completely around) the axial centerline 28. The inner barrel 60 is arranged axially along the axial centerline 28 between (a) the inlet lip skin 58 and its inner lip portion 72 and (b) the fan case 44. The inner barrel 60 of FIG. 2, for example, projects axially aft from its intersection 78 with the inner lip portion 72 to an aft end 82 of the inner barrel 60. This inner barrel aft end 82 may also be an aft end 84 of the inlet structure 34. The inner barrel aft end 82 of FIG. 2 axially neighbors (e.g., is axially adjacent, axially abuts, etc.) a forward end 86 of the fan case 44 along the axial centerline 28. At least (or only) the inlet lip skin 58 and its inner lip portion 72, the inner barrel 60 and a forward portion of the fan case 44 may thereby collectively form a radial outer peripheral boundary of the inlet flowpath 46 (e.g., to the fan rotor).

The outer barrel 62 extends circumferentially about (e.g., completely around) the axial centerline 28. The outer barrel 62 is arranged axially along the axial centerline 28 between (a) the inlet lip skin 58 and its outer lip portion 74 and (b) the fan cowls 36. The outer barrel 62 of FIG. 2, for example, projects axially aft from its intersection 80 with the outer lip portion 74 to an aft end 88 of the outer barrel 62. This outer barrel aft end 88 of FIG. 2 is axially recessed (in an axial forward direction along the axial centerline 28) from the inner barrel aft end 82 towards the nacelle forward end 30. It is contemplated, however, the outer barrel aft end 88 may alternatively be axially aligned with or may be disposed axially aft of the inner barrel aft end 82 in other embodiments. Referring again to FIG. 2, the outer barrel aft end 88 axially neighbors a forward end 90 of each fan cowl 36 along the axial centerline 28. As the outer barrel 62 extends axially towards the fan cowls 36 (e.g., to the outer barrel aft end 88), the outer barrel 62 axially overlaps and may diverge radially away from (in the radial outward direction) the inner barrel 60. The outer barrel 62 is thereby radially outboard of and may circumscribe at least a forward portion of the inner barrel 60.

The bulkhead 64 extends circumferentially about (e.g., completely around) the axial centerline 28. The bulkhead 64 is arranged radially between and is connected to at least one of the inner barrel 60 and the outer barrel 62. The bulkhead 64 of FIG. 2, for example, is connected to the outer barrel 62 at (e.g., on, adjacent or proximate) its outer barrel aft end 88. The bulkhead 64 projects radially (in a radial inward direction towards the axial centerline 28) from the outer barrel 62 towards the inner barrel 60. The bulkhead 64 of FIG. 2, for example, extends radially between and to the outer barrel 62 and the acoustic structure 66. In the arrangement of FIG. 2, a radial inner end 92 of the bulkhead 64 is axially spaced along the axial centerline 28 forward from the inner barrel aft end 82. An aft portion of the inner barrel 60 and the acoustic structure 66 may thereby project axially out from (e.g., be cantilevered from) a remainder of the inlet structure 34. Here, the bulkhead 64 and its inner end 92 are axially aligned with an intermediate location axially along the acoustic structure 66.

At least some of the inlet structure elements 58, 60, 62 and 64 may be formed integral with one another. The inlet lip skin 58, the inner barrel 60, the outer barrel 62 and the bulkhead 64, for example, may be collectively formed as a unitary polymeric body. This polymeric body forms a shell 94 at least partially or completely around the foam core 68 as described below in further detail. The inlet lip skin 58, the inner barrel 60, the outer barrel 62 and the bulkhead 64, for example, may be laid up about the foam core 68 using a polymeric material, where the foam core 68 may provide an (e.g., fly away) inner formation tool (e.g., a form, a die, etc.) for the laying up of the shell 94—the polymeric body.

Figure 3A:
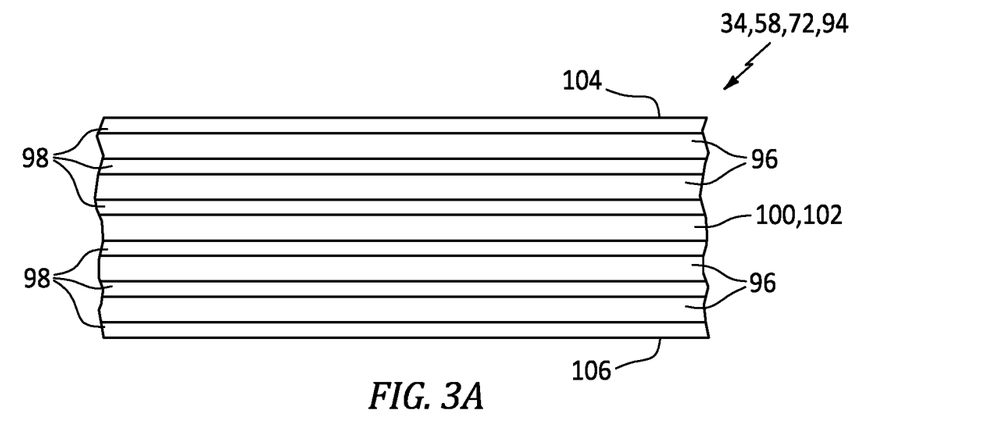
FIGS. 3A-C are partial schematic sectional illustrations of a shell of the inlet structure with various different layer configurations.
Figure 3B:
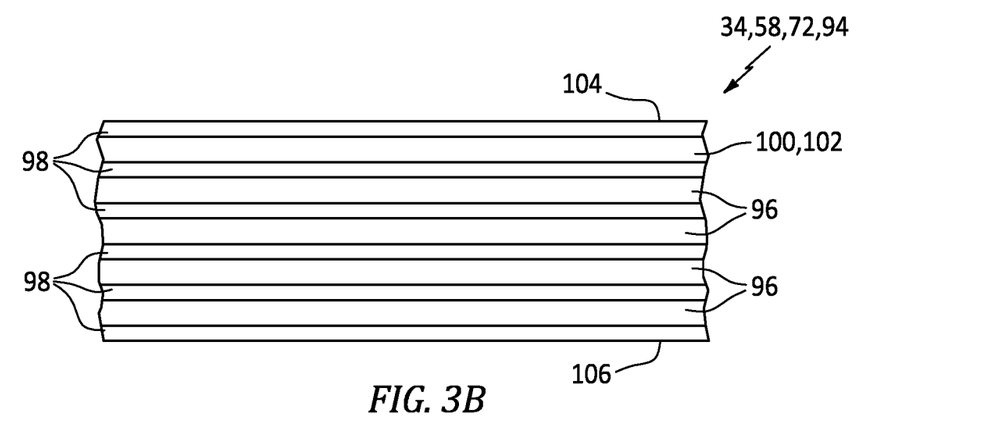
Figure 3C:
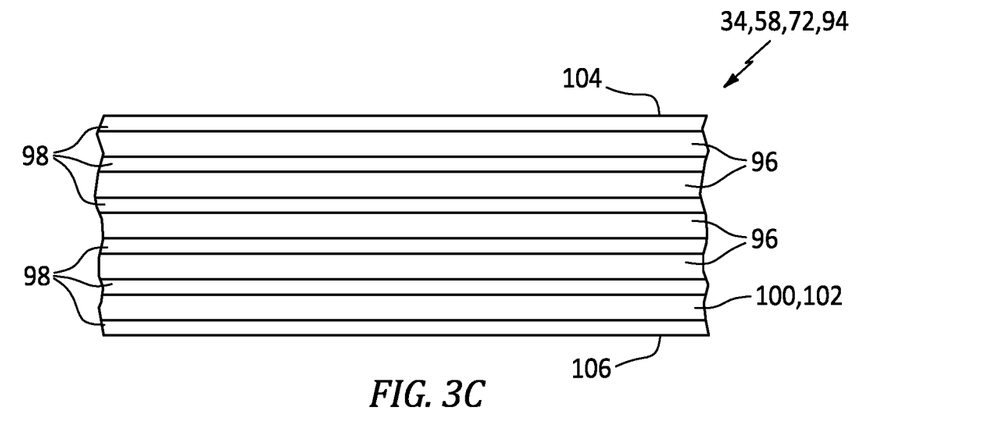

The polymeric material may be or otherwise include a fiber-reinforced polymeric material. The shell 94 of FIGS. 3A-C, for example, includes fiber-reinforcement 96 within a polymeric binder 98. The shell 94 of FIGS. 3A-C also includes an electric heater 100, which electric heater 100 may be arranged in and along at least (or only) the inlet lip skin 58 and, more particularly, the inner lip portion 72 (see region in FIG. 2) for example. Here, the fiber-reinforcement 96 and the electric heater 100 of FIGS. 3A-C are embedded within the polymeric matrix, where the shell elements 96, 98 and 100 collectively form the inlet lip skin 58/the inner lip portion 72. The remainder of the shell 94 (e.g., the shell members 60, 62, 64 and 74) may have the same or a similar construction without, for example, the electric heater 100.

The fiber-reinforcement 96 may be arranged into the one or more reinforcement layers. Each layer of the fiber-reinforcement 96 includes one or more long strand fibers, short strand fibers and/or chopped fibers. Prior to consolidation of the shell 94 and its elements 96, 98 and 100, the fibers in each reinforcement layer may be woven into a weave or otherwise arranged together to provide a fiber-reinforcement cloth or mat. Examples of the fiber-reinforcement 96 include, but are not limited to, fiberglass material, carbon fiber material and aramid (e.g., Kevlar®) material. In some embodiments, each shell member 58, 60, 62, 64 may include the same type and/or pattern (e.g., weave) of the fiber-reinforcement 96. In other embodiments, the type and/or the pattern of the fiber-reinforcement 96 may be varied within one or more of the shell member 58, 60, 62 and/or 64, and/or tailored to the specific shell member location and functionality. For example, the fiber-reinforcement 96 within the inlet lip skin 58, the inner barrel 60 and/or the outer barrel 62 may be or otherwise include the fiberglass material and/or the carbon fiber material. The fiber-reinforcement 96 within the bulkhead 64, however, may be or also include (or include more of) the aramid material to protect components aft of the inlet structure 34 from damage in the unlikely event of a (e.g., severe) bird strike impact. Moreover, while each shell member 58, 60, 62, 64 may include the same number of reinforcement layers, it is also contemplated the number of reinforcement layers may alternatively be varied within one or more of the shell member 58, 60, 62 and/or 64, and/or between shell member 58, 60, 62 and 64.

The polymeric binder 98 of FIGS. 3A-C provides a polymeric matrix into which the fiber-reinforcement 96 and the electric heater 100 are disposed; e.g., embedded, encapsulated, etc. The polymeric binder 98 may be a thermoplastic binder or a thermoset binder (e.g., a thermoset resin). Examples of the thermoplastic binder/material include, but are not limited to, polyether ether ketone (PEEK), polyetherimide (PEI) and polyphenylene sulfide (PPS). The thermoset binder/material may be any suitable thermoset epoxy; e.g., an epoxy that includes epoxy rings, phenolics, bismaleimides (BMI), etc.

While the shell 94 is described above as including each member 58, 60, 62 and/or 64, the present disclosure is not limited to such an exemplary arrangement. For example, it is contemplated the bulkhead 64 and the other member 58, 60 and 62 may be formed in discrete formation steps.

Figure 4A:
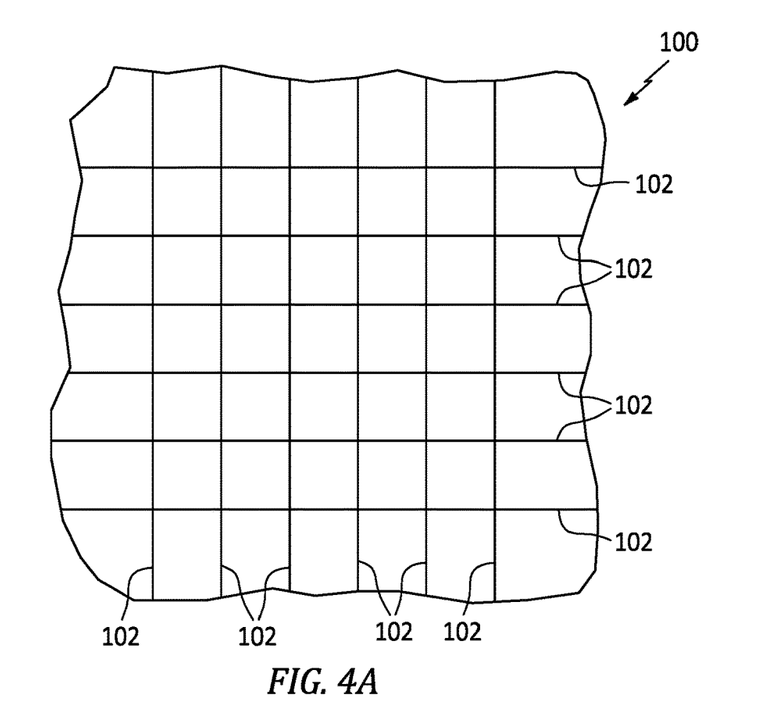
FIGS. 4A and 4B are partial schematic illustrations of an electric heater with various heating element arrangements.
Figure 4B:
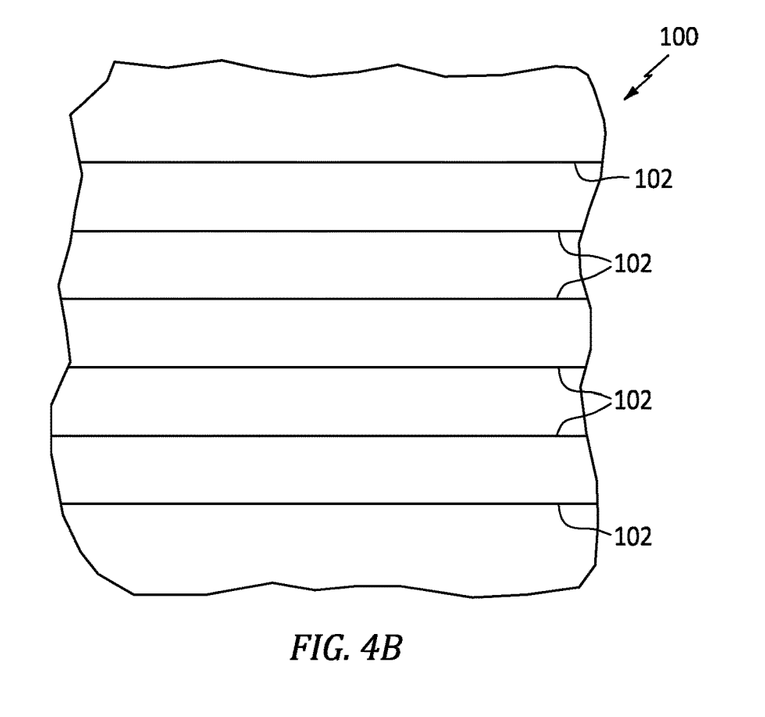

Referring to FIGS. 4A and 4B, the electric heater 100 includes one or more electric heating elements 102 arranged in a grid (e.g., see FIG. 4A), an array (e.g., see FIG. 4B) or any other arrangement. The heating elements 102 may be electrically interconnected to provide a single heating zone across/along the inlet lip skin 58 and, more particularly, the inner lip portion 72 (see region in FIG. 2) for example. Alternatively, the heating elements 102 may be configured to provide multiple discrete heating zones across/along the inlet lip skin 58 and, more particularly, the inner lip portion 72 (see region in FIG. 2) for example. Each of the heating elements 102 may be configured as an electric carbon nanotube heater. One or more or all of the heating elements 102, however, may alternatively be configured as another type of electrically resistive heating element such as a resistive metal heating wire.

Referring to FIGS. 3A-C, the electric heater 100 and its heating elements 102 are thermally coupled with an exterior surface 104 of the inlet structure 34 and its inlet lip skin 58 through at least the polymeric binder 98. Referring to FIG. 3A, the electric heater 100 and its heating elements 102 may be arranged (e.g., sandwiched) laterally between multiple layers of the fiber-reinforcement 96 and/or the polymeric binder 98. The electric heater 100 may thereby be disposed intermediately (e.g., midway) between an interior surface 106 of the inlet lip skin 58 and the exterior surface 104 of the inlet lip skin 58. Alternatively, referring to FIG. 3B, the electric heater 100 and its heating elements 102 may be arranged adjacent (or otherwise at) the exterior surface 104 of the inlet lip skin 58. Still alternatively, referring to FIG. 3C, the electric heater 100 and its heating elements 102 may be arranged adjacent (or otherwise at) the interior surface 106 of the inlet lip skin 58. The heating elements 102, of course, may also be located at multiple different lateral locations within the inlet lip skin 58 between its interior surface 106 and its exterior surface 104 to provide a multi-layer heater arrangement.

Figure 5:
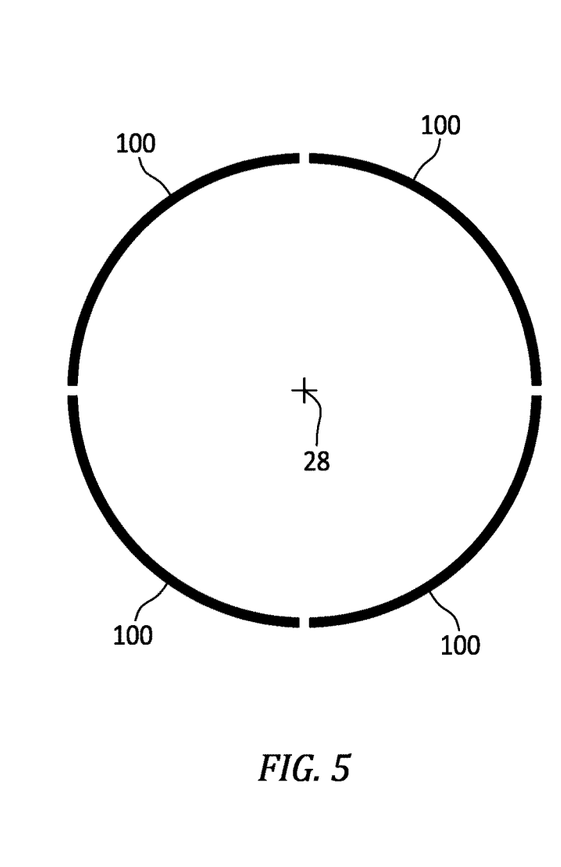
FIG. 5 is a schematic illustration of a circumferential array of the electric heaters.
Figure 6:
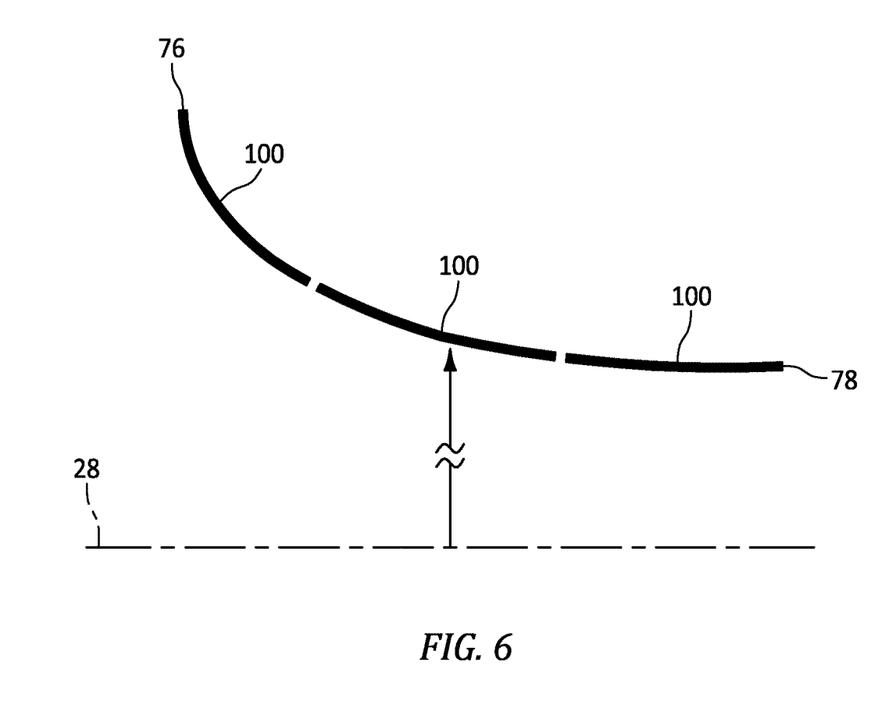
FIG. 6 is a schematic illustration of a longitudinal array of the electric heaters.

Referring to FIG. 2, the electric heater 100 extend within/along the inlet lip skin 58 and its inner lip portion 72. The electric heater 100 of FIG. 2, for example, extends longitudinally uninterrupted within the inner lip portion 72 from (or about) its intersection 76 with the outer lip portion 74 to (or about) its intersection 78 with the inner barrel 60. This electric heater 100 also extends uninterrupted within the inner lip portion 72 circumferentially about (e.g., completely around) the axial centerline 28. The electric heater 100 may thereby have a full-hoop geometry. Alternatively, referring to FIG. 5, the electric heater 100 may be one of multiple electric heaters 100 arranged circumferentially side-by-side in an array about the axial centerline 28. In addition or alternatively, referring to FIG. 6, the electric heater 100 may be one of multiple electric heaters 100 arranged end-to-end in an array longitudinally along the inlet lip skin 58 and its inner lip portion 72 (see FIG. 2) (e.g., generally axially along the axial centerline 28).

Figure 7:
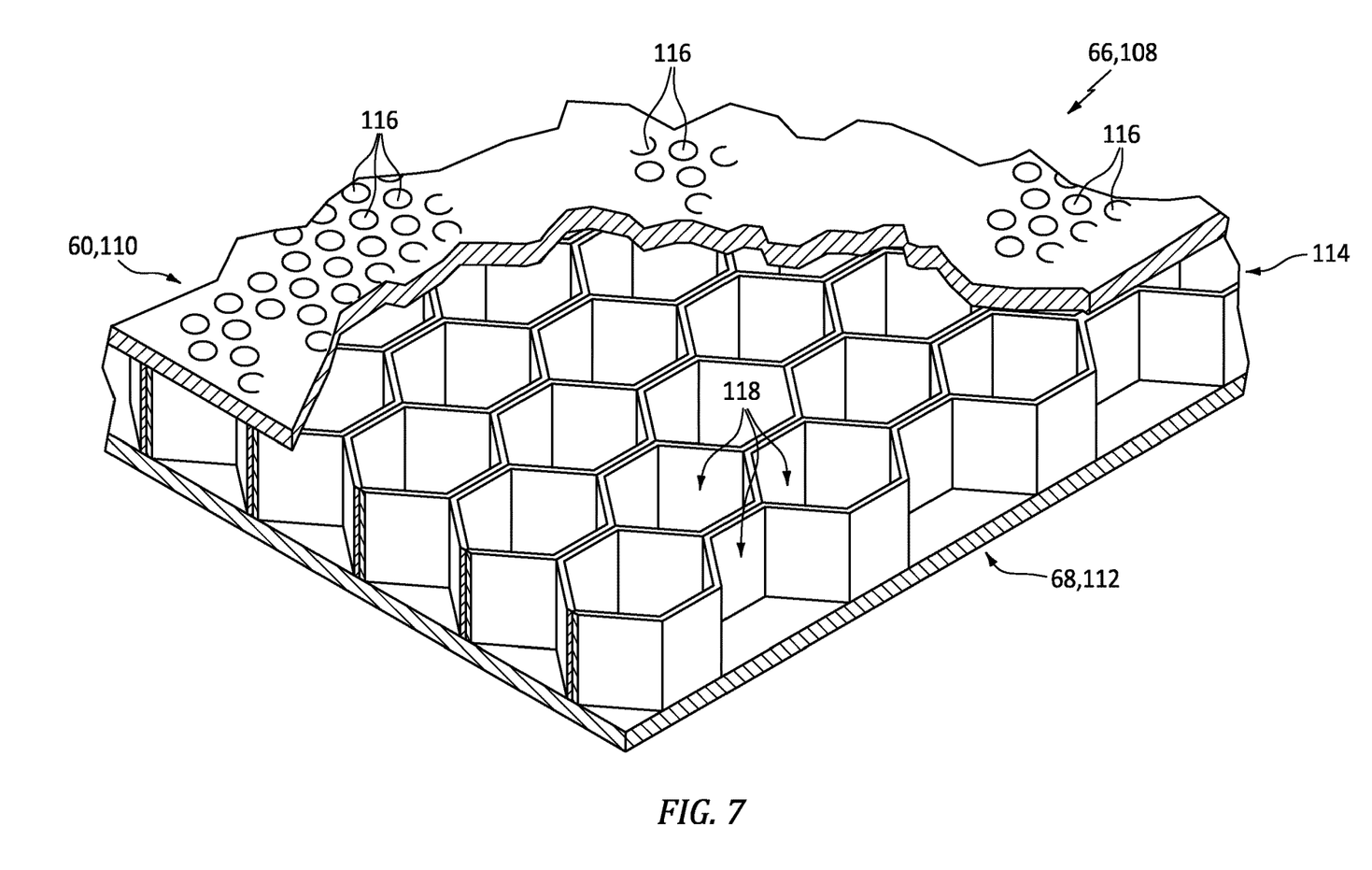
FIG. 7 is a partial cutaway illustration of an acoustic structure.

Referring to FIG. 2, the acoustic structure 66 is configured to attenuate sound (e.g., noise) generated during operation of the aircraft propulsion system 20 and, more particularly for example, sound generated by rotation of the fan rotor within the fan section. The acoustic structure 66 of FIG. 2, for example, include at least one tubular acoustic panel 108 or a plurality of arcuate acoustic panels 108 arranged side-by-side in an array circumferentially about the axial centerline 28. Referring to FIG. 7, the acoustic structure 66 and each of its acoustic panels 108 includes a perforated face skin 110, a (e.g., non-perforated) backing member 112 and a cellular core 114; e.g., a honeycomb or other porous core. The face skin 110 may be formed by the inner barrel 60. For example, at least a portion or an entirety of a longitudinal length of the inner barrel 60 of FIG. 2 between the intersection 78 and the inner barrel aft end 82 may be perforated. The inner barrel 60 of FIG. 7, in particular, includes a plurality of perforations 116 (e.g., through-holes), where each perforation 116 extends (e.g., radially) through the inner barrel 60. The backing member 112 may be formed by the foam core 68 (schematically shown). The cellular core 114 is arranged (e.g., radially) between and connected to the face skin 110 and the backing member 112. With this arrangement, the acoustic structure 66 and its respective acoustic panel 108 includes one or more acoustic chambers 118 (e.g., resonance cavities) between the face skin 110 and the backing member 112. Each of these acoustic chambers 118 of FIG. 7 extends through the cellular core 114 from the backing member 112 to the face skin 110. Each of the acoustic chambers 118 of FIG. 7 is also fluidly coupled with one or more of the perforations 116 in the face skin 110.

Referring to FIG. 2, the foam core 68 is configured to (e.g., completely) fill an internal volume of the inlet structure 34. The foam core 68 of FIG. 2, for example, extends axially within the inlet structure 34 from the bulkhead 64 to the inlet lip skin 58 and its inner and outer lip portions 72 and 74. The foam core 68 extend radially within the inlet structure 34 from the inner lip portion 72 to the outer lip portion 74. The foam core 68 also extends radially within the inlet structure 34 between the inner barrel 60 and the outer barrel 62. The foam core 68 of FIG. 2, for example, extends radially within the inlet structure 34 from the acoustic structure 66 and, more particularly, each cellular core 114 to the outer barrel 62. Here, each cellular core 114 is disposed in a channel 120 (e.g., a pocket, a recession, etc.) in the foam core 68. The channel 120 of FIG. 2, for example, extends radially into the foam core 68 to a radial outer channel side 122. The channel 120 of FIG. 2 extends axially into the foam core 68 to an axial forward channel end 124. The channel 120 may also extend circumferentially within the foam core 68 about (e.g., completely around) the axial centerline 28. This channel 120 may be sized such that an inner side of each cellular core 114 is (e.g., radially) flush with a radial inner side of the foam core 68; e.g., at the intersection 78.

With the foregoing arrangement, the foam core 68 may be used as the (e.g., fly away) inner formation tool for the laying up of the shell 94—the polymeric body. For example, the channel 120 may be machined or otherwise formed into the foam core 68. Each cellular core 114 may be mated with the channel 120. The polymeric material may then be laid up about an exterior of the foam core 68 and the inner side of each cellular core 114 to form the shell 94. The inner barrel portion of the shell 94 may then be perforated to provide the perforated face skin 110 for each acoustic panel 108. Here, the foam core 68 may structurally reinforce and support the shell 94. Use of the foam core 68 may also obviate a need for expensive manufacturing tooling such as large dies.

The foam core 68 may be constructed from a closed cell foam or an open cell foam. This foam may be a structural aerospace foam and/or a polyurethane foam. An example of the foam for the foam core 68 is Rohacell® foam from Evonik Industries of Essen, Germany. Another example of the foam for the foam core 68 is Solimide® foam from Boyd Corporation of Boca Raton, Florida, United States. The foam core 68 of the present disclosure, of course, is not limited to the foregoing exemplary foams.

The anti-icing system 56 of FIG. 2 includes the electric heater 100 that is part of/integrated with inlet lip skin 58. The anti-icing system 56 also includes a controller 126, one or more electrical lines 128 (e.g., a wiring harness) and an electrical power source 130; e.g., one or more batteries, an electric generator, etc. This anti-icing system 56 is configured to melt and/or prevent ice accumulation on the exterior surface 104 along at least the inlet lip portion 72, for example, at, along and near the leading edge 70. The controller 126, for example, may signal the power source 130 (or a switch and/or other regulator between the power source 130 and each electric heater 100) to provide electricity to each electric heater 100 through the electrical line(s) 128. Here, each electric line 128 extends (e.g., is routed, passes, etc.) through an internal passage 132 within the foam core 68. The electric lines 128 and the respective internal passages 132 may be distributed circumferentially about the axial centerline 28 in an array; e.g., a circular array. The electricity energizers each electric heater 100 and its heating elements 102, and each electric heater 100 generates heat energy. Referring to FIGS. 3A-C, the heat energy transfers (e.g., conducts) through at least the polymeric material towards (e.g., to) the exterior surface 104 thereby heating that exterior surface 104 to an elevated temperature.

The elevated temperature may be selected to be warm enough to melt any ice accumulating on the exterior surface 104 and/or prevent accumulation of the ice on the exterior surface 104, while cool enough so as not to damage the inlet lip skin 58 of FIG. 2 or any surrounding components (e.g., the adjacent foam core 68) and/or needlessly expend energy. For example, where the polymeric material is a thermoplastic material, the elevated temperature is selected to be less than a melting temperature of the thermoplastic material as well as less than a softening temperature of the thermoplastic material. The term "softening" may describe a temperature at which a thermoplastic material becomes soft and permanently deformable; e.g., pliable, malleable, manipulatable, etc. For example, when the thermoplastic material is heated to a temperature above its softening temperature (but below its melting temperature), the thermoplastic material may be soft enough to lose its previous shape due to gravitational sagging and/or other forces. By contrast, when the thermoplastic material is heated to a temperature below its softening temperature, the thermoplastic material may remain stiff and retain its form.

Figure 9:
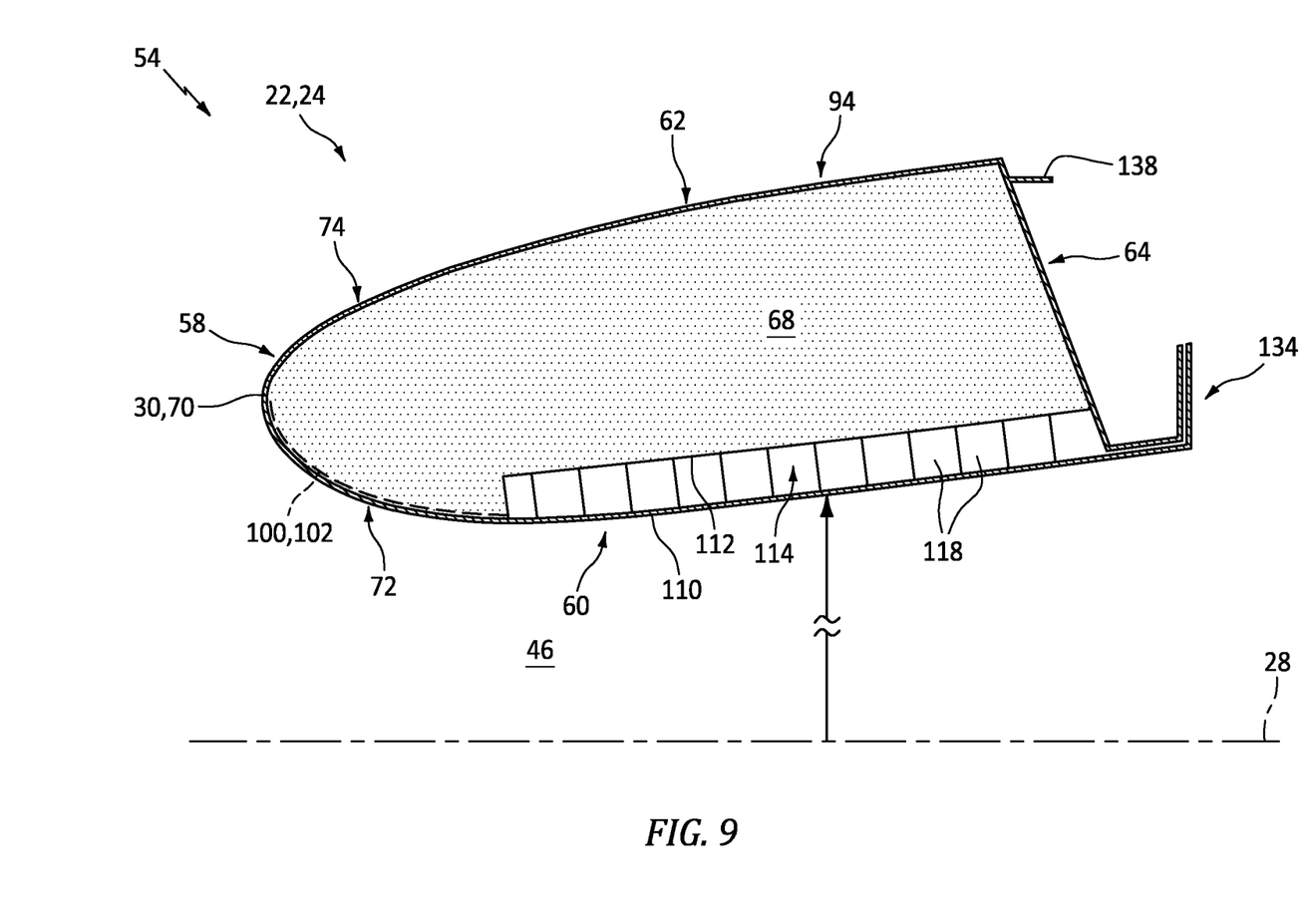
FIG. 9 is a partial sectional illustration of the nacelle inlet structure with the cellular core formed by the foam core.

The inlet structure 34 may be mounted to the fan case 44 through an inlet structure mount 134; e.g., an engine attach flange. The mount 134 of FIG. 2 is disposed at the aft end 84 of the inlet structure 34. This mount 134 is connected to (e.g., bonded, mechanically fastened and/or otherwise attached to) the acoustic structure 66 and the bulkhead 64. The mount 134 may be formed from or otherwise include metal or polymeric material. Where the mount 134 is constructed from polymeric material, it is contemplated the mount 134 may be formed integral with the shell 94 (see also FIG. 9).

Figure 8:
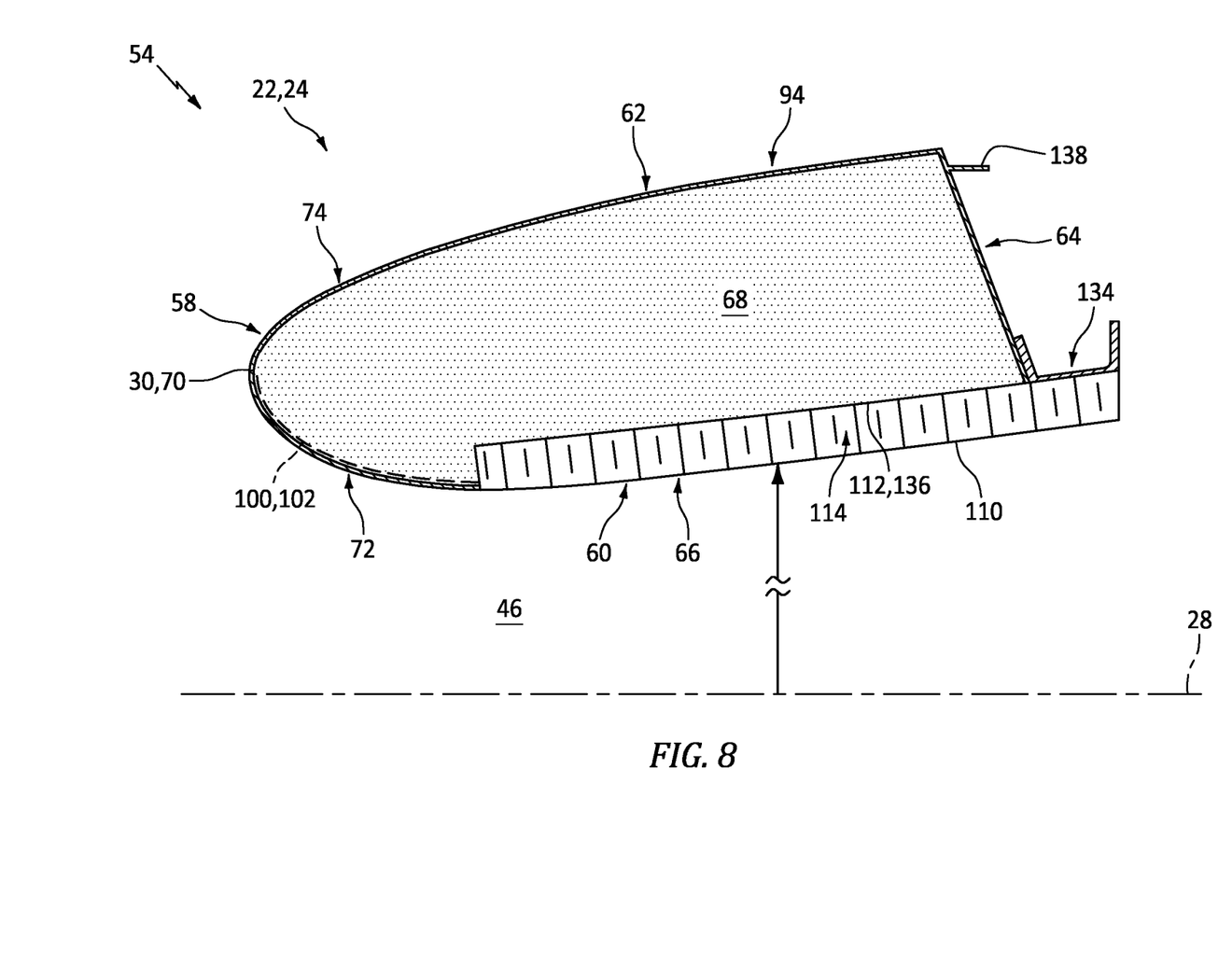
FIG. 8 is a partial sectional illustration of the nacelle inlet structure with a back skin between a cellular core of the acoustic structure and a foam core.

In some embodiments, referring to FIG. 2, each backing member 112 may be formed by the foam core 68. In other embodiment, referring to FIG. 8, each backing member 112 may alternatively be formed by a (e.g., non-perforated) back skin 136 of the respective acoustic panel 108. Here, the back skin 136 is disposed (e.g., radially) between and connected to the foam core 68 and the cellular core 114. In still other embodiments, referring to FIG. 9, each backing member 112 and each cellular core 114 may be formed by (e.g., integrated as part of) the foam core 68. The acoustic chambers 118 of FIG. 9, for example, are machined into the foam core 68. The present disclosure, however, is not limited to the foregoing exemplary acoustic structure configurations.

In some embodiments, referring to FIG. 2, the electric heater 100 may (e.g., only) be disposed within/along the inner lip portion 72 of the inlet lip skin 58. However, in other embodiments, each electric heater 100 may also be disposed within/extend along at least a forward region of the outer lip portion 74 of the inlet lip skin 58. Each electric heater 100 may also or alternatively be disposed within/extend along at least a forward region of the inner barrel 60.

In some embodiments, referring to FIG. 2, the inlet structure 34 may also include one or more (e.g., arcuate) cowl lands 138. Each cowl land 138 of FIG. 2 is disposed at the aft end 84 of the inlet structure 34. Each cowl land 138 of FIG. 2, for example, is connected to and projects axially aft (e.g., is cantilevered) from the bulkhead 64. Each cowl land 138 is configured to provide a land against which the respective fan cowl 36 may (e.g., radially) abut or otherwise rest on.

In some embodiments, the inlet structure 34 and its members 58, 60, 62, 64, 68 are provided as a unitary, full-hoop body. In other embodiments, however, the inlet structure 34 and its members 58, 60, 62, 64, 68 may alternatively be divided into a plurality of arcuate segments. These segments may be arranged side-by-side in an array circumferentially about the axial centerline 28. The segments may also be attached together to collectively form the inlet structure 34.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle inlet structure extending axially along and circumferentially about an axis, the nacelle inlet structure including an inlet lip skin, an inner barrel, an outer barrel, a foam core, an acoustic structure and an electric heater integrated with the inlet lip skin;
   the inlet lip skin forming a leading edge of the nacelle inlet structure;
   the inner barrel projecting axially aft from the inlet lip skin, and the inner barrel forming a perforated face skin of the acoustic structure;
   the outer barrel projecting axially aft from the inlet lip skin, and the outer barrel radially outboard of the inner barrel;
   the foam core radially between the inner barrel and the outer barrel, and the foam core axially overlapping the perforated face skin and projecting axially to the inlet lip skin; and an electric line electrically coupled to the electric heater, the electric line projecting axially through an internal passage within the foam core.

2. The assembly of claim 1, wherein
the nacelle inlet structure further includes a bulkhead;
the bulkhead is connected to the outer barrel at an aft end of the outer barrel; and
the foam core extends axially within the nacelle inlet structure from the inlet lip skin to the bulkhead.

3. The assembly of claim 1, wherein
the nacelle inlet structure further includes a bulkhead;
the bulkhead extends radially from the acoustic structure to the outer barrel; and
the foam core extends axially within the nacelle inlet structure from the inlet lip skin to the bulkhead.

4. The assembly of claim 1, wherein
the nacelle inlet structure further includes a bulkhead;
the bulkhead extends radially from the inner barrel to the outer barrel; and
the foam core extends axially within the nacelle inlet structure from the inlet lip skin to the bulkhead.

5. The assembly of claim 1, wherein
the nacelle inlet structure further includes a bulkhead;
the bulkhead extends radially to the outer barrel, and the bulkhead is aligned with an intermediate location axially along the acoustic structure; and
the foam core extends axially within the nacelle inlet structure from the inlet lip skin to the bulkhead.

6. The assembly of claim 1, wherein
the nacelle inlet structure further includes a bulkhead radially between the inner barrel and the outer barrel;
the bulkhead is formed integral with the inlet lip skin, the inner barrel and the outer barrel; and
the foam core extends axially within the nacelle inlet structure from the inlet lip skin to the bulkhead.

7. The assembly of claim 1, wherein
a channel extends radially into the foam core; and
the acoustic structure includes a cellular core radially outboard of the perforated face skin, and the cellular core is disposed in the channel.

8. The assembly of claim 7, wherein the channel projects axially into the foam core.

9. The assembly of claim 1, wherein the foam core extends radially out from the acoustic structure to the outer barrel.

10. The assembly of claim 1, wherein the acoustic structure includes a cellular core radially outboard of the perforated face skin, and the foam core comprises the cellular core.

11. The assembly of claim 1, wherein
the inlet lip skin comprises a polymeric material; and
the electric heater is embedded within the polymeric material.

12. The assembly of claim 11, wherein the polymeric material comprises thermoplastic material.

13. The assembly of claim 11, wherein
the polymeric material includes a polymeric matrix and fiber-reinforcement embedded within the polymeric matrix; and
the electric heater is embedded within the polymeric matrix.

14. The assembly of claim 1, wherein the electric heater comprises a carbon nanotube heater.

15. The assembly of claim 1, wherein
the electric heater is a first electric heater forming a first heating zone along the inlet lip skin; and
the nacelle inlet structure further includes a second electric heater integrated with the inlet lip skin and forming a second heating zone along the inlet lip skin.

16. The assembly claim 1, further comprising:
a fan case;
the nacelle inlet structure mounted to the fan case, and the inner barrel axially adjacent the fan case.

17. An assembly for an aircraft propulsion system, comprising:
a nacelle inlet structure extending axially along and circumferentially about an axis, the nacelle inlet structure including an inlet lip skin, an inner barrel, an outer barrel, a bulkhead and a foam core;
the inlet lip skin forming a leading edge of the nacelle inlet structure;
the inner barrel projecting axially aft from the inlet lip skin;
the outer barrel projecting axially aft from the inlet lip skin;
the bulkhead radially between the inner barrel and the outer barrel, and the bulkhead formed integral with the inlet lip skin, the inner barrel and the outer barrel;
the foam core radially between the inner barrel and the outer barrel, and the foam core extending axially within the nacelle inlet structure from the inlet lip skin to the bulkhead; and
an electric line projecting axially through an internal passage in the foam core.

18. An assembly for an aircraft propulsion system, comprising:
a fan case extending axially along and circumferentially about an axis;
a nacelle inlet structure mounted to the fan case, the nacelle inlet structure extending axially along and circumferentially about the axis, and the nacelle inlet structure including an inlet lip skin, an inner barrel, an outer barrel, a foam core and an electric heater;
the inlet lip skin forming a leading edge of the nacelle inlet structure;
the inner barrel projecting axially aft from the inlet lip skin to the fan case;
the outer barrel projecting axially aft from the inlet lip skin;
the foam core radially between the inner barrel and the outer barrel, and the foam core extending axially within the nacelle inlet structure to the inlet lip skin;
the electric heater integrated with the inlet lip skin; and
an electric line projecting axially through an internal passage within the foam core and electrically coupled to the electric heater.

19. The assembly of claim 17, wherein the nacelle inlet structure further includes an electric heater along the inlet lip skin, and the electric line is electrically coupled to the electric heater.

* * * * *